United States Patent
Patel

(10) Patent No.: US 10,501,641 B2
(45) Date of Patent: Dec. 10, 2019

(54) INORGANIC PHOSPHATE CERAMICS AND COATINGS

(71) Applicant: Latitude 18, Inc., Wilson, NC (US)

(72) Inventor: Sameerkumar Vasantlal Patel, Raleigh, NC (US)

(73) Assignee: LATITUDE 18, INC., Sims, NC (US)

( * ) Notice: Subject to any disclaimer, the term of this patent is extended or adjusted under 35 U.S.C. 154(b) by 398 days.

(21) Appl. No.: 14/768,127

(22) PCT Filed: Feb. 15, 2013

(86) PCT No.: PCT/US2013/026403
§ 371 (c)(1),
(2) Date: Aug. 14, 2015

(87) PCT Pub. No.: WO2014/126585
PCT Pub. Date: Aug. 21, 2014

(65) Prior Publication Data
US 2015/0376418 A1 Dec. 31, 2015

(51) Int. Cl.
| | | |
|---|---|---|
| *C09D 5/08* | (2006.01) | |
| *C04B 24/42* | (2006.01) | |
| *C04B 28/34* | (2006.01) | |
| *C23C 22/60* | (2006.01) | |
| *C23C 22/62* | (2006.01) | |
| *C23C 22/66* | (2006.01) | |
| *C23C 22/76* | (2006.01) | |
| *C09D 1/00* | (2006.01) | |
| *C09D 5/16* | (2006.01) | |
| C04B 111/20 | (2006.01) | |
| C04B 111/27 | (2006.01) | |

(52) U.S. Cl.
CPC .............. *C09D 5/08* (2013.01); *C04B 24/42* (2013.01); *C04B 28/34* (2013.01); *C04B 28/348* (2013.01); *C09D 1/00* (2013.01); *C09D 5/16* (2013.01); *C23C 22/60* (2013.01); *C23C 22/62* (2013.01); *C23C 22/66* (2013.01); *C23C 22/76* (2013.01); *C04B 2111/2092* (2013.01); *C04B 2111/27* (2013.01); *C23C 2222/20* (2013.01); *Y02W 30/94* (2015.05)

(58) Field of Classification Search
None
See application file for complete search history.

(56) References Cited

U.S. PATENT DOCUMENTS

| | | | |
|---|---|---|---|
| 6,169,066 B1 | 1/2001 | Gasmena | |
| 2008/0020145 A1 | 1/2008 | Pipko et al. | |
| 2008/0221263 A1* | 9/2008 | Kanagasabapathy | ........................ C09D 5/1618 524/588 |
| 2008/0286609 A1 | 11/2008 | Surace et al. | |
| 2011/0143154 A1* | 6/2011 | Wagh | ...................... C09D 5/08 428/472.3 |
| 2011/0143910 A1 | 6/2011 | Wagh et al. | |
| 2012/0005833 A1 | 3/2012 | Smith et al. | |
| 2012/0058330 A1 | 3/2012 | Smith et al. | |

FOREIGN PATENT DOCUMENTS

| | | |
|---|---|---|
| CN | 102770583 A | 11/2012 |
| CN | 102781871 A | 11/2012 |
| WO | 2007009935 A2 | 1/2007 |

OTHER PUBLICATIONS

EPO; Extended European Search Report for European Application No. 13875064.1 dated Jan. 25, 2017, 13 pages.
International Bureau of WIPO; International Preliminary Report on Patentability for International Application No. PCT/US2013/026403 dated Aug. 27, 2015, 13 pages.
SIPO; Office Action for Chinese Application No. 201380075676.0 dated Aug. 25, 2016, 12 pages.
EPO; Partial Search Report for European Application No. 13875064.1 dated Oct. 17, 2016, 8 pages.
SIPO; Office Action for Chinese Application No. 201380075676.0 dated Aug. 21, 2017, 4 pages.
EPO; Office Action for European Application No. 13875064.1 dated Apr. 13, 2018, 4 pages.
European Patent Office; Office Action for European Patent Application No. 13875064.1 dated Nov. 7, 2018, 4 Pages.
Korean Intellectual Property Office; International Search Report for International Application No. PCT/US2013/026403 dated Nov. 18, 2013, 17 pages.

\* cited by examiner

*Primary Examiner* — Nathan T Leong
(74) *Attorney, Agent, or Firm* — Christopher J. Knors; Moore & Van Allen PLLC

(57) ABSTRACT

This disclosure relates to hydrophobic metal phosphate ceramic comprising a Group IV element of silicon, germanium, tin, or lead having at least one hydrocarbon covalently bonded thereto. Methods of providing water proofing and/or anti-corrosion protection are provided.

11 Claims, No Drawings

INORGANIC PHOSPHATE CERAMICS AND COATINGS

CROSS-REFERENCE TO RELATED APPLICATIONS

This application is filed under the provisions of 35 U.S.C. § 371 and claims the benefit of International Patent Application No. PCT/US2013/026403, filed on Feb. 15, 2013, which is hereby incorporated by reference in its entirety.

TECHNICAL FIELD

This disclosure relates to hydrophobic metal phosphate ceramic comprising a Group IV element of silicon, germanium, tin, or lead having at least one hydrocarbon covalently bonded thereto. Specifically, the inorganic phosphate ceramic composition is prepared from one or more acidic phosphate components, a molar excess of one or more of alkaline metal oxide or metal hydroxide components, and an effective amount of one or more of a Group IV element of silicon, germanium, tin, or lead having at least one hydrocarbon covalently bonded thereto.

BACKGROUND

Providing waterproofing to ceramic and or cementitious forms or coatings has proven elusive. Typically, water resisting materials are included in the pre-set formulation in the desire to have them bloom or migrate to the surface upon or after setting. Such techniques result in the dissipation of the water repellency properties over time. The basic nature of such materials has resisted most attempts at incorporating materials directly into the ceramic/cement structure without altering, in a negative way, the properties of the ceramic/cement. Providing bacterial and/or mold resistance to metallic and non-metallic surfaces, without the use of fungicidal and bactericidal chemicals in the form of ceramic coatings has proven elusive. Typically, one or more fungicides and bactericides are included in the pre-set ceramic or cement formulation in the desire to have them bloom or migrate to the surface upon or after setting. Such techniques result in the dissipation of the fungicidal/bactericidal properties over time and further require using an excess of such additives. Moreover, the use of specific fungicides and bactericides or classes of fungicides and bactericides ultimately results in resistant strains of these organisms.

SUMMARY

In a first embodiment, metal phosphate ceramic is provided. The metal phosphate ceramic comprising a Group IV element of silicon, germanium, tin, or lead having at least one hydrocarbon moiety covalently bonded thereto.

In a first aspect of the first embodiment, the at least one hydrocarbon moiety is independently, $C_{1-20}$ alkyl, phenyl, aryl; where alkyl includes straight-chain, branched, or cyclic alkyl, haloalkyl (e.g. fluoro- or chloro alkyl).

In another aspect, alone or in combination with any one of the previous aspects of the first embodiment, the Group IV element is directly or indirectly covalently and/or mechanically bonded to the metal phosphate ceramic.

In another aspect, alone or in combination with any one of the previous aspects of the first embodiment, the Group IV element is silicon.

In another aspect, alone or in combination with any one of the previous aspects of the first embodiment, the composition further comprises, chemically bound, one or more inorganic mineral silicate, wollastonite, talc, amorphous magnesium silicate, amorphous calcium silicate, diatomaceous earth, silicon dioxide, calcined kaolin, colloidal silica, and amorphous silicon dioxide.

In a second embodiment, method of forming a hydrophobic metal phosphate ceramic is provided. The method comprises combining: (i) at least one sparingly soluble acidic phosphate component; (ii) at least one sparingly soluble basic oxide or hydroxide component; and (iii) at least one hydrophobic agent comprising a Group IV element of silicon, germanium, tin, or lead having at least one hydrocarbon covalently bonded thereto. The hydrocarbon is independently, $C_{1-20}$ alkyl, phenyl, aryl; where alkyl includes straight-chain, branched, or cyclic alkyl, haloalkyl.

In one aspect of the second embodiment, the Group IV element is silicon.

In another aspect, alone or in combination with any one of the previous aspects of the second embodiment, the at least one hydrophobic agent is at least one polymeric or oligomeric siloxane with reactive silanol and/or alkoxyl groups, or, is at least one organosiliconate.

In another aspect, alone or in combination with any one of the previous aspects of the second embodiment, the at least one acidic phosphate component is at least one of mono potassium phosphate, mono calcium phosphate, and their hydrates. The at least one sparingly soluble basic component is at least one of magnesium oxide, barium oxide, zinc oxide, calcium oxide, copper oxide, and hydroxides thereof, or, independently or in combination, magnesium brine containing an effective amount of magnesium hydroxide.

In another aspect, alone or in combination with any one of the previous aspects of the second embodiment, the at least one acidic phosphate component is at least one of alkali metal dihydrogen phosphate $MH_2PO_4$, alkali earth dihydrogen phosphate $M(H_2PO_4)_2$ or its hydrate, and mixtures thereof. The at least one acidic phosphate component can be at least one of mono potassium phosphate (MKP), mono calcium phosphate, and their hydrates.

In another aspect, alone or in combination with any one of the previous aspects of the second embodiment, the at least one sparingly soluble basic component is one or more of magnesium oxide, magnesium hydroxide, calcium oxide, and calcium hydroxide.

In another aspect, alone or in combination with any one of the previous aspects of the second embodiment, the at least one acidic phosphate component is one or more of mono potassium phosphate, mono calcium phosphate, and their hydrates, and the at least one sparingly soluble basic component is one or more of magnesium oxide, magnesium hydroxide, calcium oxide, and calcium hydroxide.

In another aspect, alone or in combination with any one of the previous aspects of the second embodiment, the method further comprising combining one or more of an inorganic mineral silicate, wollastonite, talc, amorphous magnesium silicate, amorphous calcium silicate, diatomaceous earth, silicon dioxide, and amorphous silicon dioxide.

In another aspect, alone or in combination with any one of the previous aspects of the second embodiment, the combining is performed with high shear.

In a third embodiment, a metal phosphate ceramic precursor formulation is provided. The formulation comprising: at least one sparingly soluble acidic phosphate component; at least one sparingly soluble metal oxide/hydroxide component in molar excess to that of the at least one sparingly soluble acidic phosphate component; at least one sparingly soluble inorganic mineral; and at least one hydrophobic agent in combination with one or both of the at least one sparingly soluble acidic phosphate component and the at least one sparingly soluble basic metal oxide or hydroxide component, the hydrophobic agent comprising at least one Group IV element having a hydrocarbon covalently bonded thereto, where the Group IV element is one or more of silicon, germanium, tin, or lead.

In an aspect, alone or in combination with any one of the previous aspects, the hydrophobic agent is of the general formula (I) or (II) or (III) or (IV):

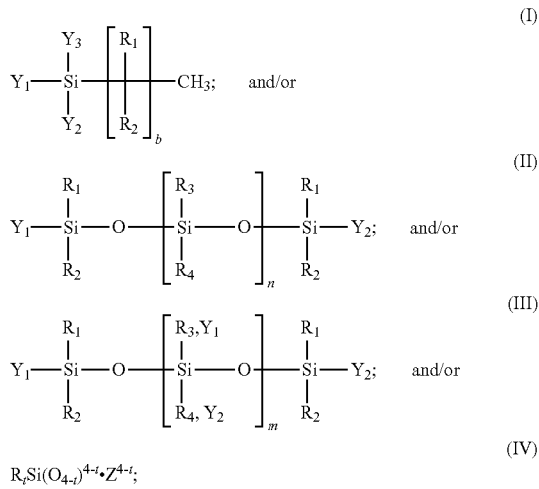

$$R_tSi(O_{4-t})^{4-t} \cdot Z^{4-t}; \quad (IV)$$

where:

$R_1$, $R_2$, $R_3$, and $R_4$ are, independently, hydrogen, $C_{1-20}$ alkyl, phenyl, aryl; where alkyl includes straight-chain, branched, cyclic or acyclic alkyl, or haloalkyl;

$Y_1$, $Y_2$, and $Y_3$ is, independently, hydroxyl, $C_{1-4}$ alkoxy, phenoxide, or halogen; or, $Y_1$, $Y_2$, and $Y_3$ is, independently, an alkali metal salt, an ammonium salt, an alkylammonium salt, a phenylammonium salt, or an alklyphenylammonium salt of Si—OH;

b is 0-21; n is greater than 1,000 to 1,000,000;

m is 0-1,000; and

Z is sodium or potassium. The precursor may further comprise one or more of a sparingly soluble inorganic mineral silicate, wollastonite, talc, amorphous magnesium silicate, amorphous calcium silicate, diatomaceous earth, silicon dioxide, calcined kaolin, colloidal silica, and amorphous silicon dioxide.

In a fourth embodiment, an aqueous composition as a slurry or suspension is provided. The aqueous composition comprises, the aqueous composition comprising: at least one sparingly soluble metal oxide or metal hydroxide; at least one sparingly soluble inorganic phosphate; at least one sparingly soluble inorganic mineral; and at least one soluble basic inorganic salt.

In an aspect, alone or in combination with any one of the previous aspects, the at least one acidic phosphate component is at least one of mono potassium phosphate, mono calcium phosphate, and their hydrates, and the sparingly soluble basic component is at least one of magnesium oxide, magnesium hydroxide, calcium oxide, or calcium hydroxide.

In an aspect, alone or in combination with any one of the previous aspects, wherein the at least one sparingly soluble inorganic mineral is one or more of an inorganic mineral silicate, wollastonite, talc, amorphous magnesium silicate, amorphous calcium silicate, diatomaceous earth, aluminosilicate, olivine, calcined Kaolin, mullite, colloidal silica, silicon dioxide, or amorphous silicon dioxide.

In an aspect, alone or in combination with any one of the previous aspects, the aqueous composition further comprises the hydrophobic agent described above.

In a fifth embodiment, a method of preventing or reducing fungal and/or bacterial growth on a surface is provided. The method comprising contacting a surface with the metal phosphate ceramic of any one of aspects of above, wherein the surface, after contacting, provides a basic environment of at least pH 9; and preventing or reducing fungal or bacterial growth on the surface. In one aspect, the surface is associated with a medical article, medical device, medical equipment, hydroelectric dam, ship hull, or structure.

In a sixth embodiment, method of preventing or reducing attachment of Mollusca on a surface is provided. The method comprising: combining the metal phosphate ceramic precursor formulation of any of the previous embodiments or aspects; contacting a surface with the combined metal phosphate ceramic precursor formulation, wherein the surface, after contacting, provides a basic environment of at least pH 9 to pH 14; and preventing or reducing attachment of Mollusca on the surface. In one aspect, the Mollusca are zebra mussel or quagga mussel.

BRIEF DESCRIPTION OF THE DRAWINGS

NONE

DETAILED DESCRIPTION

The present disclosure provides, among other things, a uniquely-suited, hydrophobic phosphate-based composite coatings having hydrophobic properties that minimize or reduce the penetration of water and/or corrosion of metals, for example steels and iron and make it unnecessary to use alloys of steel or iron such as galvanized (zinc coated) compositions or chrome plated compositions.

As used herein, the phrases "acidic phosphate component" and "acidic phosphate precursor" and "acid component" and "Part A" are used interchangeably unless otherwise indicated. As used herein, the phrase "sparingly soluble acidic phosphate component" refers to inorganic phosphates of chemical formula $A^m(H_2PO_4)_m \cdot nH_2O$, where A is metal cation, or mixtures thereof; where m=1-3, and n=0-6.

As used herein phrases "sparingly soluble basic metal oxide and sparingly soluble basic metal hydroxide component" and "sparingly soluble basic component" and "sparingly soluble alkaline component" and "sparingly soluble alkaline precursor" are used interchangeably unless otherwise indicated. The phrases "sparingly soluble basic component" and "sparingly soluble alkaline component" and "sparingly soluble alkaline precursor" are inclusive of materials that are sparingly soluble, e.g., have low solubility product constants in aqueous media, e.g., e.g., solubility constants (Ksp) of at least $10^{-4}$, $10^{-5}$, $10^{-6}$, $10^{-7}$, $10^{-8}$, $10^{-9}$ or smaller. In one aspect, the solubility of the sparingly soluble basic component is less than about 0.1 moles/liter water. In one aspect, the phrases sparingly soluble basic metal oxide and sparingly soluble basic metal hydroxide component" and "sparingly soluble basic component" and "sparingly soluble alkaline component" and "sparingly soluble alkaline precursor" are exclusive of materials that are readily soluble, e.g., have high solubility product constants in aqueous media.

As used herein, the phrase "soluble basic inorganic salt" is inclusive of materials that are readily aqueous soluble, e.g., solubility constants (Ksp) of at least $10^{-3}$, $10^{-2}$ or greater, and have an aqueous pH of between about 10 to about 14, between about 11 to 14, between about 12 to 14, or between about 13 to 14. In one aspect, the solubility of the soluble basic inorganic salt is greater than about 0.1 moles/liter water, or greater than about 1 moles/liter water. "Basic inorganic salt of an inorganic acid" and "basic inorganic salt" include, by way of example, one or more of a bi-, and/or tri-alkali and/or alkali earth salt of phosphate ($PO_4^{-3}$), silicate ($SiO_4^{-3}$), alkyl silicate (alkyl-$SiO_3^{-3}$), or aluminate ($Al_2O_4^{-2}$). Other readily aqueous soluble basic inorganic salts, providing an aqueous pH of greater than 10, greater than 11, greater than 12, greater than 13, or an aqueous pH of between 10 and 14, can be used, for example, potassium hydroxide, and to a lesser extent, sodium hydroxide. The amount of basic inorganic salt present in an aqueous mixture of the sparingly soluble basic metal oxide/hydroxide component, alone or in combination with one or more sparingly aqueous soluble inorganic silicates, can be between about 1 weight percent to about 95 weight percent, or about 3-75 weight percent, or 5-50 weight percent solids.

As used herein, the phrase "aqueous mixture" refers to a combination of at least a quantity of water and at least one of the acid phosphate or sparingly soluble basic component. For example, the aqueous mixture can contain mostly water and suspended, dispersed, or slurried components, and may also contain non-aqueous components such as alcohols and other solvents. Preferably, water is the major liquid phase.

The amount of solids (e.g., the acid phosphate, sparingly soluble basic component and/or other solids) present in the aqueous mixture can be between 1 weight percent to about 95 weight percent, preferably 35-90 weight percent, or 50-80 weight percent solids.

In one aspect, the hydrophobic agent is of the general formula (I) or (II) or (III):

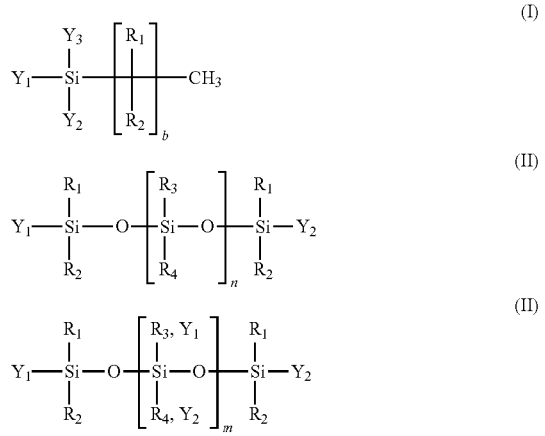

where $x \geq 1 \leq 3$; $R_1$, $R_2$, $R_3$, and $R_4$ are, independently, hydrogen, $C_{1-20}$ alkyl, phenyl, aryl; where alkyl includes straight-chain, branched, or cyclic alkyl, haloalkyl; where $Y_1$, $Y_2$ is, independently: hydroxyl, $C_{1-4}$ alkoxy, halogen, phenoxide, or, $Y_1$, $Y_2$ is an alkali metal salt with, ammonium salt, alkylammonium salt, phenylammonium salt, or alklyphenylammonium salt of Si—OH; n is greater than 1,000 to 1,000,000; m is 0-1,000. Formulas (I) or (II) can be solids or liquids, and can be used neat or in aqueous emulsions (including surfactants). Combinations of two or more of formulas (I), (II), and (III) can be used in any amount in Part A and in Part B; or in any combination and amount with either Part A or Part B, in both Part A or Part B; or only in Part A, or only in Part B. Compositions of formulas I-III include where $R_1$, $R_2$, $R_3$, and $R_4$ are, independently, a fluoroalkyl, e.g., trifluoromethyl terminated alkyls of 1-20, 2-20, or 2-4 carbons. Other fluoroalkyls can be used.

In another aspect, the hydrophobic agent is of the general formula (IV):

where $m \geq 1 \leq 3$; $R_1$, $R_2$, and $R_3$ are, independently, $C_{1-20}$ alkyl, phenyl, aryl; where alkyl includes straight-chain, branched, or cyclic alkyl, unsubstituted, or substituted with halogen; where Z is, independently, one or more of an alkali metal cation, alkali earth cation, or ammonium cation. Ammonium cation is inclusive of one or more of tetra(alkyl, benzyl)ammonium cation, tri(alkyl,benzyl)ammonium cation, di(alkyl,benzyl)ammonium cation tetra(benzyl)ammonium cation, monoaalkylammonium cation, tetraalkylammonium cation, triaalkylammonium cation, or dialkylammonium cation. Compositions of formula IV include where $R_t$ is methyl, ethyl, (sec- or tert-)butyl, where t=1 and Z is sodium or potassium. Compositions of formula IV include where $R_t$ is a fluoroalkyl, e.g., trifluoromethyl terminated alkyls of 1-20, 2-20, or 2-4 carbons. Other fluoroalkyls can be used. In one aspect, the alkylsiliconate salt can be both the soluble basic inorganic salt and the hydrophobic agent.

Combinations of two or more of formulas (I), (II), (III), and (IV) can be used in any amount in Part A and in Part B; or in any combination and amount with either Part A or Part B, in both Part A or Part B; or only in Part A, or only in Part B. In one aspect, the use of formula (IV) with a single, short chain alkyl, (e.g., methyl or ethyl) as a alkali metal organosiliconate salt may be used. While not to be held to any particular theory, formula (IV) with a single, short chain alkyl is believed to provide an organosiliconate moiety as an integrated component of the metal phosphate ceramic where the size and/or nature of the alkyl group imparts a minimum effect on the ceramic properties while optimizing the hydrophobicity thereof.

In one aspect, the hydrophobic agent comprises one or more siloxanes and/or polysiloxanes. A number of polysiloxanes, with varying backbone structure are suitable for use as a precursor component. With reference to Equation (1), various forms of polysiloxanes, e.g. the M, T, Q, and D backbones, where R is, independently, alkyl or aryl, are presented:

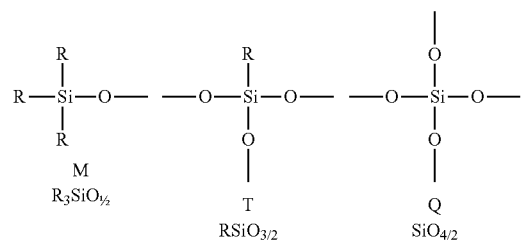

-continued

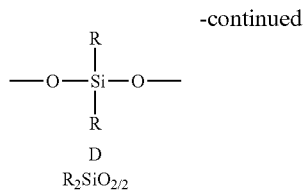

D
$R_2SiO_{2/2}$

In various aspects, the polysiloxane can comprise one or more reactive functional groups. The polysiloxane can be mixed with non-reactive silicone containing polymers. Examples of reactive silicone containing polymers with reactive groups include, for example, linear or branched polysiloxanes, and/or linear or branched polysiloxanes with multiple reactive groups such as Si—H (silicon hydride), hydroxy, alkoxy, amine, chlorine, and thiol functional groups. Some specific examples of such linear or branched polysiloxanes include functional group-terminated and/or branched functional group polydimethyl siloxanes, polydimethyl-co-diphenyl siloxanes and polydimethyl-co-methylphenylsiloxanes. The reactive groups can be located at one or both terminuses of the reactive silicone polymers, and/or anywhere along the backbone and/or branches of the polymer.

In one aspect, one or more of the hydrophobic agents can comprise a silsesquioxane and/or polyhedral oligomeric silsesquioxane moiety ("POSS moieties"). POSS moieties suitable for the present disclosure are represented generally by Formula (1) below:

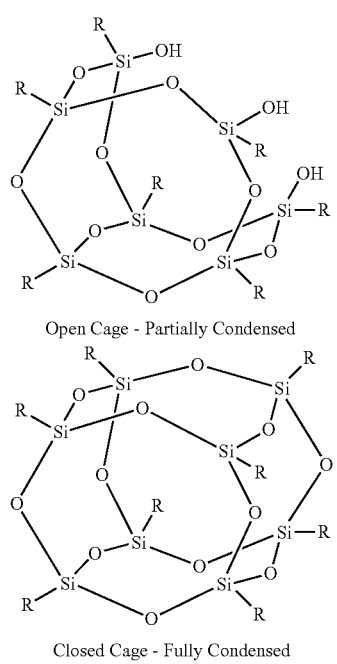

(1)

Open Cage - Partially Condensed

Closed Cage - Fully Condensed showing a representative example of an open cage, partially condensed and closed cage, fully condensed POSS moiety, wherein the R groups may be the same or different, optionally with at least one of the R groups being a group having chemical functionality, further described below. The R group may be the same or different, selected from hydrogen, hydroxy, alkoxy, amine, chlorine, or thiol. In the above aspects, at least one of the R groups can optionally be a non-reactive group, which may be the same or different, independently selected from substituted, branched, un-branched, cyclic, or acyclic $C_{1-30}$ alkyl, and aryl and/or substituted, branched, or un-branched $C_{6-30}$ substituted aryl groups.

"POSS moiety", as used herein is inclusive of polyhedral oligomeric silsesquioxanes, and compounds, organic polymers/oligomers, inorganic polymers/oligomers, and/or organic-inorganic polymers containing one or more open and/or closed cage silsesquioxane moieties, with any of the R groups and/or chemical functional groups, described above. Examples of suitable POSS moieties encompassed by the present disclosure include, but are not limited to, open-cage and/or closed cage molecules, having from zero up to and including eight non-reactive or reactive sites, where each of the sites, independently, can be substituted/unsubstituted alkyl-, branched/un-branched alkyl-, cyclic/acyclic alkyl-, hydroxyl-, alkoxyl-, amine-, halo/chloro-, hydrogen-, thiol-, silanol-, aryl, substituted aryl, and/or styrenyl-containing groups.

In one aspect, polymeric or oligomeric silicones, silanols, and/or silicates with at least one silicon-carbon bond are included with the acidic phosphate and/or basic metal oxide/hydroxide component of a metal phosphate ceramic. Introduction of an effective amount of one or more of a polymeric or oligomeric silicone, silanol, and/or silicate with at least one silicon-carbon bond provides, in certain aspects, provides hydrophobic properties to the metal phosphate ceramic. In other aspects, introduction of an effective amount of one or more of a silicone, silanol, and/or silicate with at least one silicon-carbon bond provides, in certain aspects, a non-porous, hydrophobic phosphate ceramic product that is essentially water proof. The introduction of an effective amount of one or more of a polymeric or oligomeric silicone, silanol, and/or silicate with at least one silicon-carbon bond provides, in certain aspects, a phosphate ceramic coating for corrodible metals suitable for use in corrosive environments and/or capable of electrically isolating the metallic surface.

In addition to the management of the hydrophobicity, the present disclosure provides manufacturing methods that optimize the preparation of the acidic phosphate components and the sparingly soluble basic components prior to combination so as to manage the chemical reactions and/or pH of the chemical reactions of the metallic surface and the acidic phosphate components and the sparingly soluble basic components. The manufacturing methods further improve the incorporation of polymeric or oligomeric silicones, silanols, and/or silicates with at least one silicon-carbon bond into the composition further providing insoluble, non-porous phosphate coatings that can eliminate the need for conventional pre- and/or post-treatment of the metallic surface.

Examples of the inorganic phosphate coatings provided herein include a magnesium potassium phosphate coating, and calcium potassium phosphate coating, either of which optionally contains the one or more hydrophobic agents discussed above. In one aspect, the coating comprises the hydrophobic agent chemically integrated therewith. These compositions are disclosed herein for providing metal phosphate ceramics, as well as coatings on steels, aluminum, and other corrodible metals.

It has now been observed that certain hydrophobic agents, such as, for example, polymeric or oligomeric silicones, silanols, and/or organosiliconates with at least one silicon-carbon bond when added to or formed "in-situ" with an acidic phosphate component/sparingly soluble basic component formulation greatly enhance the water resistance, water proofing, electric isolation, and/or corrosion resistance of the coating.

It has also been observed that certain hydrophobic agents, such as, for example, polymeric or oligomeric silicones, silanols, and/or organosiliconates with at least one silicon-carbon bond, in combination with one or more inorganic silicates, $SiO_2$, wollastonite, and/or amorphous magnesium silicate, when added to or formed "in-situ" with an acidic phosphate component/sparingly soluble basic component greatly enhance the water resistance, water proofing, electric isolation, and/or corrosion resistance of the metal-phosphate ceramic.

The above hydrophobic metal-phosphate ceramic can be used as monolithic forms, or as coatings that serve as a surface preparation for further coating and/or painting, a function it performs effectively with excellent adhesion. In contrast to the conventional methods of passivating/corrosion protecting metal surfaces, the present disclosure provides improving the metal-phosphate ceramic, reducing its porosity and/or reducing its crystallinity such that the hydrophobicity is controlled and/or corrosion preventive aspects, and others, are chemically associated with the metal-phosphate ceramic.

In one aspect, the aqueous suspension of acidic phosphate component comprises one or more acid phosphate salts, optionally comprising one or more hydrophobic agents, with or without phosphoric acid, calcined kaolin, and/or colloidal silica, the mixture having a pH between about 1 and about 6 (preferably being between about 1.5 to about 5, more preferably between about 2 to about 4).

The aqueous suspension of sparingly soluble basic component comprises alkali minerals, optionally comprising one or more hydrophobic agents, having a pH between about 8 to about 12, preferably about 9 to about 14, more preferably a pH between about 11 to about 13. Hydrophobic agents alone or in combination with wollastonite, amorphous magnesium silicate, silica, amorphous silicon dioxide, diatomaceous earth, olivine, and the like can be added to the acidic phosphate and/or the basic metal oxide/hydroxide component.

Because of the difference in solubility, the acidic phosphate component, with a higher solubility than that of the sparingly soluble basic component, can enter into solution first or in slight excess, and can react with the metallic surface (e.g., iron/steel) to provide metallic ions (e.g., ferrous ions) at the surface and/or in the aqueous phosphate suspension, which is relatively acidic at the metallic surface. As the sparingly soluble basic component goes into solution, it can react with the acidic phosphate component and/or the metallic ions, and chemically combine with the metallic phosphate at the surface and/or in solution. It is generally believed that the suspension can become temporarily alkaline in the local environment of the metallic surface, which may result in more acidic phosphate from the suspension to enter into solution such that the local environment about the metallic surface slurry becomes acidic again. This acid-base equilibrium process can repeat multiple times, with the system ultimately reaching a thermodynamic and/or kinetic equilibrium at the metallic surface that is believed to be in the alkaline range. In this process, it is further believed that the hydrophobic agents, which are generally alkaline as aqueous suspensions, can be chemically incorporated into the metallic-phosphate and/or chemically bond to the metallic surface. To be clear, such hydrophobic agents are not simply "fillers." The hydrophobic agents are added and intended to chemically combine with one or more of the acidic phosphate component, the sparingly soluble basic component, and/or a metallic surface, and/or the metallic phosphate moieties present and/or created. The hydrophobic agents can be combined, synergistically, for example, with inorganic silicates, such as wollastonite, talc, amorphous magnesium silicate, amorphous calcium silicate, diatomaceous earth, silicon dioxide, olivine, calcined kaolin, mullite, alumino silicate, and amorphous silicon dioxide, which also can combine with one or more of the acidic phosphate component, the sparingly soluble basic component, and/or the metallic surface, and/or the metallic phosphate moieties present and/or created. Other silicates can be used.

During this equilibrium process the polymeric or oligomeric silicones, silanols, and/or organosiliconates with at least one silicon-carbon bond can hydrolyze and combine with the acidic phosphate and/or basic metal oxide/hydroxide and/or with the one or more inorganic silicates, $SiO_2$, wollastonite, and/or amorphous magnesium silicate.

In one aspect, the instant method provides for a treated iron or steel surface, at least one iron-magnesium-phosphate moiety is believed formed, e.g., a hydrophobic, hydrated magnesium hydrogen iron phosphate, that is chemically distinct from $FePO_4(2H_2O)Fe_3(PO_4)_2(8H_2O)$, and/or $Fe_5H_2(PO_4)_2(4H_2O)$ provided by conventional iron phosphating processes, the latter being generally crystalline and porous, the former having at least on silicon-carbon bond. Additional compositions, including, polyphosphates, and/or amorphous organo-Group IV moieties, as discussed above, as well as inorganic metal-silicates, discussed below, can be present and provide additional and/or synergistic water penetration and/or corrosion protection.

The final pH of the metal phosphate ceramic or a coating prepared from same can be provided in the passivation range of steel, e.g., between about pH 9 and about pH 12, between about pH 9.5 and about pH 11.5, between about pH 10.0 and about pH 11.0, between about pH 9.0 and about pH 10.5, between about pH 9.5 and about pH 10.0, between about pH 10.0 and about pH 10.5. In one aspect, the surface of a coated article can be provided with a basic nature, for example between about pH 9 and about pH 12, between about pH 9.5 and about pH 11.5, between about pH 10.0 and about pH 11.0, between about pH 9.0 and about pH 10.5, between about pH 9.5 and about pH 10.0, between about pH 10.0 and about pH 10.5 to prevent or inhibit bacterial and/or microorganism growth or colonization on the surface of the coated article. The coated article can be, for example, a medical article, ship hull, surface, or water treatment facility component.

Similar conversion coatings can be provided for aluminum or aluminum alloys using the methods and compositions herein disclosed, and optionally, the addition of hydrophobic agents selected from those which are optimal for aluminum or aluminum alloys. Other corrosion inhibitors, in addition to or independently, can be added to the acidic phosphate component/sparingly soluble basic component composition prior to set. While not to be held to any particular theory, it is believed that the silicate can covalently bind to aluminum and providing an anti-corrosion function, preventing or reducing oxidation of aluminum to its corrosion product (e.g., aluminum oxide) and/or reducing or eliminating mold and/or bacteria growth on its surface.

Addition of other hydrophobic agents than those described above, in the acidic phosphate/sparingly soluble basic component composition, can be employed.

In one aspect, the instant compositions can be configured as separate, atomizible, sprayable inorganic phosphate precursors that can be sprayed at a relatively thin thickness. The compositions can hold high solids contents and yet still hold the solids until setting and thus avoiding the solids migrating or dislodging from the point of application, e.g., down a wall, beam, curved surface, or from a ceiling surface. Such spray coated phosphate ceramic compositions produce high-strength, rapid-setting phosphate ceramic coatings that provide corrosion protection and/or be used as an undercoating in combination with a polymeric coating or paint, such as an acrylic- or urethane-based coating or paint. In one aspect, said phosphate spray coating compositions are suitable for spray coating on metal surfaces, for example, structural elements and chassis of transportation vehicles such as automobiles, trains, cycles, aerospace vehicles, trucks, and buses.

In one aspect, the atomizable phosphate ceramic composition can comprise an acidic phosphate component comprising an aqueous solution, suspension, or slurry of an acid-phosphate, for example, of chemical formula $A_m(H_2PO_4)_m \cdot nH_2O$, where A is hydrogen ion, ammonium cation, metal cation, or mixtures thereof; where m=1-3, and n=0-6; the first component solution adjusted to a pH of about 2 to about 5; a sparingly soluble basic component, comprising, for example, an aqueous solution, suspension, or slurry of an alkaline oxide or alkaline hydroxide represented by $B_{2m}O_m$, $B(OH)_{2m}$, or mixtures thereof, where B is an element of valency 2m (m=1, 1.5, or 2) the second component solution adjusted to a pH of between 9-14; and optionally a rheology modifier/suspending agent in an amount capable of providing shear thinning of either the first component or the second component and further capable of suspending a high solids content of either the first component or the second component for atomization. Optionally, pigments and/or aggregate material can be present in an amount in at least one of the acidic phosphate and the sparingly soluble basic component capable of imparting an observable color and/or texture. The above atomizible spray coating can provide a thin, paint-like coating for imparting hydrophobicity and/or corrosion resistance to metallic surfaces. The rheology modifier/suspending agent can be at least one of guar gum, diutan gum, welan gum, and xanthan gum. By using a rheology modifier/suspending agent in an amount capable of providing shear thinning of either the acidic component or the sparingly soluble basic component and further capable of suspending a high solids content of either the acidic component or the sparingly soluble basic component for atomization, excellent paint-like coatings for imparting corrosion resistance to metallic surfaces are obtained.

Examples of Group IV element with at least one carbon covalent bond include silanes, siloxanes, polysilanes, and polysiloxanes. (Poly)silanes and/or (p)olysiloxanes with reactive end-groups, e.g. alkoxy, as self crosslinking anionic or cationic emulsions or low molecular weight oligomers can be used, such as POLON™ silicone or polysiloxane surfactants/sizings, DYNASYLAN™ functionalized silanes/siloxanes and poly- or oligomeric functionalized siloxanes, and the like, in amounts of about 0.1 weight percent to about 20 weight percent, or about 1 weight percent to about 10 weight percent.

In certain aspects of the present disclosure, the metallic surface is that of a transition metal or its alloy, for example, iron, chromium, aluminum, copper, etc. Processes and articles prepared therefrom disclosed and described herein overcome many if not all of the problems related to conventional passivation processes of iron, steels, aluminum, and other corrodible metals. The instant processes also provide a more economical, environmentally-friendly method of coating steel and other metal surfaces with acid-base inorganic phosphate based coatings that not only passivate the layer but also provide abrasion resistance along with good aesthetics in one step.

The metal phosphate ceramics, when used as a coating as disclosed herein can comprise, in part, the formation of poly phosphates, and in particular, poly phosphates formed by phosphites at the interfacial regions of the substrate surface in the instant passivation layer. Polyphosphate alone or in combination with the organo-Group IV hydrophobic agent can provide impermeability to water and humidity, and, independently, can improve corrosion resistance to the metallic surface. In one aspect, polyphosphates in combination with metal silicates are present at the metallic surface and/or interfacial regions of the metal substrate as comprising the passivation layer and/or providing water resistance or water proofing of the ceramic.

Acidic phosphate component—The acidic phosphate component consists of an acid-phosphate representative of the formula, $A^m(H_2PO_4)_m \cdot nH_2O$, where A is an m-valent element such as sodium (Na, m=1), potassium (K, m=1), magnesium (Mg, m=2), calcium (Ca, m=2), aluminum (Al, m=3) etc. A may also be a reduced oxide phase when higher-valent oxides are used. For example, for iron, which exists in valence state of +2 and +3 (FeO and $Fe_2O_3$ as oxides), A can be the metal of lower oxidation state. It can also be a cation of oxides of four-valent metal oxide such as $ZrO^{2+}$, in which case m=2. $nH_2O$ in the formula above is simply the bound water, where n can be any number, normally ranging from 0 to 25.

It is possible to use hydro phosphates of trivalent metals such as aluminum, iron and manganese represented by the formula $AH_3(PO_4)_2 \cdot nH_2O$, where A is a transition metal that includes aluminum, iron, manganese, yttrium, scandium, and all lanthanides such as lanthanum, cerium, etc.

In case the pH of the acidic precursor is higher than needed for instant reaction, phosphoric acid may be added and the pH may be adjusted to bring down the pH. A preferred pH selected is between 3 and 4, and the most preferred pH is between 3 and 3.5. either elevating the pH of phosphoric acid or that of an acid-phosphate such as magnesium dihydrogen phosphate ($Mg(H_2PO_4)_2$) or aluminum trihydrogen phosphate ($AlH_3(PO_4)_2$) by neutralizing partially using an alkaline oxide, hydroxide, or a mineral, or by acidifying a dihydrogen phosphate such as mono potassium phosphate ($KH_2PO_4$) that has a pH>3.5 by adding a small but appropriate amount of phosphoric acid or a low pH acid phosphate such as $Mg(H_2PO_4)_2$ or aluminum trihydrogen phosphate $AlH_3(PO_4)_2$. Examples described later in this document provide the art of adjusting this pH.

One or more of the components of the instant composition can be wet milled to a size of about 25 to about 150 micron, about 50 to about 100 micron, or about 60 to about 80 micron in average particle size to improve atomization and/or cure/set and/or appearance qualities of the coating. In one aspect, the acidic phosphate or basic precursor is wet-milled so that the average particle size passes through 230 mesh sieve (less than 70 micron).

For oxychloride and oxysulfate compositions, the acidic component consists of magnesium oxychloride, and magnesium oxysulfates appropriately acidified with either hydrochloric acid or sulfuric acid to reduce the pH.

Water may be added to the precursor component to reduce the viscosity thereof, or other types of viscosity reducing agents and/or rheology modifiers may be used. Commercial additives that prevent algae growth may also added to this precursor so that no algae growth occurs during storage of this precursor.

Sparingly soluble basic component includes, for example, basic oxides, hydroxides and basic minerals. The sparingly soluble basic component generally consists of a sparsely soluble oxide, or preferably a hydroxide with a solubility product constant less than the acid phosphate precursor. The oxide may be represented by the formula $B^{2m}O_m$ or $B(OH)_{2m}$, where B is a 2m-valent metal. All divalent metal oxides (m=1), and some trivalent metal oxides in reduced state fall into this category of small solubility product constant oxides. Examples of divalent oxides are, but not limited to, magnesium oxide, barium oxide, zinc oxide, calcium oxide and copper oxide. Examples of trivalent oxides in reduced state are iron oxide (FeO), and manganese oxide (MnO). In preferred aspects of the instant disclosure, 0 to about 10 molar excess of sparingly soluble basic component relative to acidic component is used. For example, about 0.1-10 molar excess of $Mg(OH)_2$ based on MKP acid phosphate can be used. In one aspect, the molar ratio of acid:base components can be between about 0.9:1.0 to about 1.0:3.0; preferably about 1.0:2.0; and most preferably about 1.0:1.8. For example, the composition comprising $Mg(OH)_2$:$KH_2PO_4$=1.8:1.0 provides equal volumes of Parts A and B during spraying. In other aspects, spray coatings of the instant compositions having a molar ratio of about 1:2 or about 1:1.5 (acid:base components) with mixing, sprayed well and corrosion-protected and/or water proofed effectively.

In one aspect, to achieve a desired setting rate and prevent sagging of a coating prepared from the hydrophobic phosphate ceramic disclosed herein, about 30-50 weight percent basic metal oxide/hydroxide and about 55-75 weight percent acidic phosphate component can be used. In one preferred aspect, about 40 weight percent magnesium hydroxide and about 62 weight percent mono potassium phosphate can be used. Other loadings may be used for coating horizontal surfaces.

It has been observed that without a basic stabilizing agent, such as $K_3PO_4$, or KOH, a basic metal oxide/hydroxide with a mineral silicate (or Part B) is unstable. Surprisingly, the particular basic stabilizing agent is not intuitive, for example, $K_3PO_4$, or KOH is found effective in stabilizing a solution of a basic metal oxide/hydroxide with a mineral silicate, while NaOH does not provide as effective an amount of said stabilization. Not to be held to any particular theory, it is believed that potassium cation and/or phosphate anion contributes, in part, to the stabilization of the basic metal oxide/hydroxide and mineral silicate mixture. Thus, an effective amount of the present basic stabilizing agent provides viscosity control of a basic inorganic oxide/hydroxide with a mineral silicate or a Part B, preventing or eliminating viscosity changes with time, for example, a viscosity change that would render the a basic inorganic oxide/hydroxide with a mineral silicate or Part B unusable for spraying. In one aspect, the minimum loading of the basic stabilizing agent is about 2 to about 15 weigh percent, 3 to about 10 weight percent (of the basic metal oxide/hydroxide and mineral silicate, or Part B). More than 15 weight percent of basic stabilization agent, for example, results in changes of set time and further requires adjustment of the basic metal oxide/hydroxide.

For reasons not entirely understood, when the acidic component is phosphoric acid and the sparingly soluble basic component is a metal oxide, e.g., iron oxide, in a stoichiometric amount greater than 10% of the acidic phosphate component, corrosion resistance is less than that when using the acidic phosphate/sparingly soluble basic components herein disclosed, in particular, sparingly soluble acid/base components. Thus, in one aspect, improvement in corrosion protection is achieved when both phosphoric acid as the inorganic acidic phosphate and iron oxide as the metal oxide precursor are excluded.

In another aspect, the instant compositions, either as bulk forms or as coatings can be formulated to provide aesthetic properties, such as color, proper shine, and texture. This effect may be achieved, for example, by adding pigments, color aggregate, crushed glass, sand, etc, to the instant acidic phosphate/alkaline metal oxide/hydroxide formulations with hydrophobic agent. For example, the resulting coating comprising crushed glass prepared by the processes disclosed herein provides a very dense, glassy surface. Additional suitable ceramic pigments may be further added to produce colored paints. Soluble glass in combination with the instant compositions above can also be used in formulations for coating of solid objects, to provide very dense, glassy solid coatings having corrosion resistance.

Experimental Section

The following examples are illustrative of the embodiments presently disclosed, and are not to be interpreted as limiting or restrictive. All numbers expressing quantities of ingredients, reaction conditions, and so forth used herein may be understood as being modified in all instances by the term "about." Accordingly, unless indicated to the contrary, the numerical parameters set forth herein may be approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches. Several experimental examples, listed below, were conducted in order to formulate, coat, and demonstrate the attributes of the instant compositions disclosed herein. pH values are provided using pH meters having +/−0.5 accuracy.

Hydrophobic Inorganic Phosphate Coating Compositions

A range of phosphate compositions may be used as the corrosion inhibitor coatings commensurate with the spirit and scope of that disclosed and described herein, the following exemplary, non-limiting examples are provided:

TABLE 1

Exemplary Phosphate Ceramic Compositions

| Sample | Part A<br>Weight percent (%) of Part A | Part B<br>Weight percent (%) of Part B |
|---|---|---|
| A | mono potassium phosphate (MKP) (~63-64%)<br>phosphoric acid (~8%)<br>xanthan gum (0.15%)<br>crystalline $SiO_2$ (~1.5%)<br>remainder water | magnesium hydroxide (~38-39%)<br>wollastonite (~20-21%)<br>xanthan gum (0.07%)<br>$K_3PO_4$ (~3.5%)<br>potassium methyl siliconate (40% solids) (~9%)<br>remainder water ~27-28% |

TABLE 1-continued

Exemplary Phosphate Ceramic Compositions

| Sample | Part A Weight percent (%) of Part A | Part B Weight percent (%) of Part B |
|---|---|---|
| B | Mono Potassium Phosphate (MKP) = ~63-64% (~63-64%) phosphoric acid (~8%) xanthan gum (0.15%) crystalline $SiO_2$ (~1.5%) oligomeric short-chain alkylfunctional siloxane oligomeric or short-chain alkyl and/or phenyl siloxane with hydrolysable alkoxy groups (~1.5%) remainder water | magnesium hydroxide (~38-39%) wollastonite (~20-21%) xanthan gum (0.07%) $K_3PO_4$ (~3.5%) potassium methyl siliconate (at 40% solids) (~15%) remainder water |
| C | Mono Potassium Phosphate (MKP) = ~63-64% (~63-64%) phosphoric acid (~8%) xanthan gum (0.15%) crystalline $SiO_2$ (~1.5%) remainder water | magnesium hydroxide (~40%) wollastonite (~21%) xanthan gum (0.07%) $K_3PO_4$ (~3.5%) potassium methyl siliconate (40% solids) (~5%) remainder water |
| D | Mono Potassium Phosphate (MKP) = ~57% (~63-64%) phosphoric acid (~6%) xanthan gum (0.15%) crystalline $SiO_2$ (~1%) oligomeric short-chain alkylfunctional siloxane oligomeric or short-chain alkyl and/or phenyl siloxane with hydrolysable alkoxy groups (~1.5%) calcined kaolin (~12%) remainder water | magnesium hydroxide (~40%) xanthan gum (0.07%) $K_3PO_4$ (~3.5%) self-crosslinking anionic siloxane emulsion (40% solids) (~5%) remainder water |
| F | mono potassium phosphate (MKP) (~63-64%) phosphoric acid (~8%) xanthan gum (0.15%) crystalline $SiO_2$ (~1.5%) remainder water | magnesium hydroxide (~38-39%) wollastonite (~20-21%) xanthan gum (0.07%) $K_3PO_4$ (~3.5%) remainder water ~27-28% |

The above samples were prepared with a slight molar excess of Part B and represent a single exemplary embodiment. High molecular weight (MW) polysiloxane with hydroxy or alkoxyl reactive terminal groups was used at about 0.01 to about 10 weight percent of the component (A or B). Oligomeric polysiloxane with hydroxy or alkoxyl reactive groups was used at about 0.1 to about 20 weight percent of the component (A or B). Organosiliconate salt was used at about 0.01 to about 20 weight percent of the component (A or B).

Water Uptake/Water Absorption Testing

For water absorption testing, an ASTM Cement substrate (thickness=~0.5 inch) was used as Control. A comparative example of a phosphate cement without the hydrophobic agent was prepared and tested as a coating on the Control. Comparative sample and test samples of compositions A-D were prepared of 15-20 mils (1 mil=1/1000 inches) thickness. Weight gain of the control and each sample over the period of time (one day, 2 days, and 8 days) after submerging in water. Weight gain was converted to weight per unit area ($kg/m^2$). Results are represented as permeability ($kg/m^2$).

Typically, a coating having a water permeability of about 0.3 $kg/m^2$ or less over 24 hours is classified as water impermeable. Samples absorbing water or gaining weight less than 1 $kg/m^2$ are classified as hydrophobic (vapor permeable only). There is another classification which classifies.

As shown in Table 2, Water permeability of the cement control was greater than 5 $kg/m^2$. In comparison, samples A-D had water permeability of less than 1.0 $kg/m^2$. Samples A-C had water permeability of 0.2 $kg/m^2$ or less. Thus, the presently disclosed hydrophobic phosphate ceramic compositions provide water and permeability and/or improved water permeability resistance.

TABLE 2

Water absorption results for exemplary embodiments

| Sample (~0.5 inch thickness) | Water absorption ($Kg/m^2$) (day 1; day 2; day 8) |
|---|---|
| Cement-Control Standard ASTM Cement Substrate | 5.58; 5.62; 5.93 |
| A | 0.18; 0.06; 0.09 |
| B | 0.11; 0.10; 0.08 |
| C | 0.20; 0.09; 0.06 |
| D | 0.54; 0.54; 0.91 |

Polarization Resistance Testing

Polarization resistance data was performed on metal test samples coated with a magnesium potassium phosphate coating formed by the combination and/or reaction of magnesium oxide (MgO) (or a magnesium brine of magnesium hydroxide and magnesium salts in water) with monoalkylsilicate salt, and mono potassium phosphate ($KH_2PO_4$), which measures corrosion current of metal panel in a 3 weight percent $MgCl_3$ aqueous electrolyte solution of about 6.5. Experimental data is converted to mil per year (mpy), where mpy is the loss of metal (in thickness) due to corrosion per year when exposed to the test condition. In this test, a poor anti-corrosion coating initially shows very low number for polarization resistance (as present in mpy) that increases significantly overtime. Control samples provided about 1 mpy (mil per year) that went down with time which may be the result of formation of a thicker passivation layer. Samples coated with the compositions of the present disclosure provided initial mpy values of about 0.03 mpy that appeared to decrease to approach 0 or even negative corrosion values. While not to be held to any particular theory, the presently disclosed compositions appear to prevent the electrolyte test solution from traversing the coating and reaching the metal.

The results of testing of a number of samples is provided in Table 3. As can be seen from Table 3, the present coatings and monoliths prepared therefrom provided a basic environment of more than pH 9, and greater pH (more basic) than conventional phosphate ceramics/cements, even conventional phosphate ceramics/cements with silicate fillers, said conventional phosphate ceramics/cements prepared with an excess of acidic phosphate precursor or with equal molar amounts of acid/base components. The environment can be realized under ambient conditions of typical relative humidity or humid conditions. Such environments are effective in reducing or eliminating microbial growth and effective in at least partially neutralizing or killing one or more microbes that are presented to the surface of the present composition, whether as a coating or as a monolithic form.

described in the test method was used to further dilute the inoculum to $2.5\text{-}10 \times 10^5$ CFU/mL. The untreated sample was tested in triplicate at Time=0 and Time=24 hours to establish organism viability. The treated sample was tested at Time=24 hours. Each sample piece was placed in sterile container and then was inoculated with 0.4 mL of the inoculum. The inoculum was then covered with 40 mm$^2$ piece of sterile plastic (cut from sterile Whirlpak™ bags) in order to spread the inoculum evenly over the sample surface and hold it in place.

The samples were incubated for 24 hours at 35° C. and a relative humidity of at least 90%. At the appropriate time, the samples were placed into a sterile Whirlpak™ bag and 10.0 mL of neutralizing broth was added to the bag. The test pieces were thoroughly massaged in a bag containing the neutralizing broth (SCDLP) to facilitate the release of the inoculum from the sample surface into the neutralizing broth. Serial dilutions of the neutralizing broth containing the inoculum were plated. All plates were incubated at 35° C. for 24-48 hours. After incubation, bacterial colonies were counted and recorded.

Test Results are summarized in Table 3A below for *S. Aureus* and Table 3B for *E. coli*. An untreated MSL plastic control recovered an appropriate amount of organism at Time=0 and Time=24 to confirm organism viability. The number of viable bacteria in the test inoculum was $1.3 \times 10^5$

TABLE 3 pH of Samples and Controls

| Sample | pH | Comments |
|---|---|---|
| DI water | 6.62 | |
| CONTROL-Molded Sample Grancrete © Sample Weight Ratio (2:2:2) of (KH$_2$PO$_4$:MgO:Kaolin) | 6.70 | Bulk sample was immersed in the water and pH of water measured after ~1 hr. |
| CONTROL-Molded Sample Grancrete © Sample Weight Ratio (2:2:2) of (KH$_2$PO$_4$:MgO:Wollastonite) | 6.85 | Bulk sample was immersed in the water and pH of water measured after ~1 hr. |
| CONTROL-Molded Ceramicrete (MgO/KH$_2$PO$_4$ + Wollastonite) (Weight ratio = 1:3:6) | 7.72 | Bulk sample was immersed in the water and pH of water measured after ~1 hr. |
| CONTROL-Molded Ceramicrete (Fly ash based), weight ratio = MgO:KH$_2$PO$_4$:Fly ash = 1:3:6 | 7.9 | Bulk sample was immersed in the water and pH of water measured after ~1 hr. |
| Present Disclosure Phosphate Ceramic with molar excess of Part B component (Molded product) | 9.78 | Bulk sample was immersed in the water and pH of water measured after ~1 hr. |
| Present Disclosure Phosphate Ceramic with molar excess of Part B component (aged around 2 years) Molded product | 9.8 | Bulk sample was immersed in the water and pH of water measured after ~1 hr. |
| Present Disclosure Phosphate Ceramic with molar excess of Part B component (Aged around 3 years) (wall coating) | 10.42 | Sample measured immediately |

Antifungal/Antimicrobial Testing

The purpose of the testing was to evaluate the surface of a treated sample and untreated sample for antimicrobial effectiveness as demonstrated by the JIS Z 2801:2010 test method. Sample B and Sample F from Table 1 were separately tested under JIS Z 2801. Each sample was tested in triplicate. Test pieces were approximately 50 mm×50 mm.

Procedure: Inoculum was prepared using *Staphylococcus aureus* ATCC #6538P, and *Escherichia coli* ATCC#8739, which were adjusted with a spectrophotometer to a concentration of approximately $2.5\text{-}10 \times 10^8$ Colony-Forming Units per milliliter (CFU/mL). Dilute nutrient broth prepared as CFU/mL. This is the initial number of bacteria placed onto to the sample surface for testing. The value of the antimicrobial activity was calculated according to the formula (I) listed below and recorded as log reduction.

$$R = (Ut-Uo)-(At-Uo) = Ut-At \tag{I}$$

Where, R: antimicrobial activity; Uo: average of logarithm numbers of viable bacteria from untreated sample at Time=0; Ut: average of logarithm numbers of viable bacteria from untreated sample at Time=24 h; and At: average of logarithm numbers of viable bacteria from treated sample at Time=24 h.

TABLE 3A

*Staphylococcus aureus* Inhibition Testing of coatings disclosed herein

| | |
|---|---|
| Uo: Average of logarithm numbers of viable bacteria from untreated control at Time = 0 | 3.81 |
| Ut: Average of logarithm numbers of viable bacteria from treated control at Time = 24 h | 6.14 |
| At: Average of logarithm numbers of viable bacteria from Treated Sample F at Time = 24 h | 3.21 |

According to the standard, an antibacterial product is determined to have antibacterial effectiveness when the antibacterial activity (R) is 2.0 or more. The sample coated with a coating disclosed herein had an R value of 2.93, indicating excellent antibacterial activity against Staph-type microbes.

TABLE 3B

*E.coli* Inhibition Testing of coatings disclosed herein

| | |
|---|---|
| Uo: Average of logarithm numbers of viable bacteria from untreated control at Time = 0 | 3.93 |
| Ut: Average of logarithm numbers of viable bacteria from treated control at Time = 24 h | 5.23 |
| At: Average of logarithm numbers of viable bacteria from Sample B at Time = 24 h | 0.14 |
| At: Average of logarithm numbers of viable bacteria from Sample F at Time =24 h | 3.84 |

With regard to Table 3B, according to the standard, an antibacterial product is determined to have antibacterial effectiveness when the antibacterial activity (R) is 2.0 or more. The sample coated with Sample B (with Group IV-hydrocarbon covalent bond component) disclosed herein had an R value of 5.09 (or a 99.9996% reduction), indicating excellent antibacterial activity against *E. coli*, and was superior to similar phosphate ceramic Sample F, which also had excellent antibacterial activity against *E. coli*, having an R value of 1.39 (or a 95% reduction) without the Group IV-hydrocarbon covalent bond component.

The purpose of this experiment was to evaluate the mold resistance properties of the instant coating (Sample F; tested in triplicate) as demonstrated by the ASTM D 3273 fungal resistance test.

Procedure: The ASTM D 3273 test chamber contains soil that was seeded with fungal spores of *Aspergillus niger* ATCC#6275, *Penicillium citrinum* ATCC#9849, and *Aureobasdium pullulans* ATCC#9348 and allowed to grow. The D 3273 chamber was maintained at 32.5±1° C. with a relative humidity between 95±3%. The test samples were hung in the D 3273 chamber with three pieces of untreated generic wallboard (controls) to confirm validity of the fungal inoculum coming from the soil. Samples were examined weekly for fungal growth and defacement and rated according to visual defacement of fungal growth. Temperature and relative humidity equipment is internally validated to NIST traceable standards using an externally calibrated Vaisala MI70/HMP75B, Serial #G4730008/G4930004; A2LA accredited ISO 17025 Cert. #2083.01.

Test Results: After 4 weeks of incubation in the D 3273 chamber, the results for the test pieces can be found in Table 4 below. The control pieces performed as expected, confirming the validity of the test. Samples are rated according to degree of surface defacement. Visual defacement is determined with an unaided eye, using magnification only to confirm suspicious areas. The rating scale is as follows:

TABLE 4

*Aspergillus niger* ATCC# 6275, *Penicillium citrinum* ATCC# 9849, and *Aureobasdium pullulans* inhibition using a coating disclosed and described herein.

| Rating | Definition |
|---|---|
| 10 | No Defacement |
| 9 | 90% clear (1-10% defaced) |
| 8 | 80% clear (11-20% defaced) |
| 7 | 70% clear (21-30% defaced) |
| 6 | 60% clear (31-40% defaced) |
| 5 | 50% clear (41-50% defaced) |
| 4 | 40% clear (51-60% defaced) |
| 3 | 30% clear (61-70% defaced) |
| 2 | 20% clear (71-80% defaced) |
| 1 | 10% clear (81-90% defaced) |
| 0 | 0% clear (91-100% defaced) |

| Sample Description | | Week 1 Front | Week 2 Front | Week 3 Front | Week 4 Front |
|---|---|---|---|---|---|
| SAMPLE | 1-1 | 10 | 10 | 10 | 10 |
| | 1-2 | 10 | 10 | 10 | 10 |
| | 1-3 | 10 | 10 | 10 | 10 |
| Controls and Conditions | | | | | |
| Untreated Wallboard | | 9/9 | 3/3 | 1/2 | 0/2 |
| Untreated Wallboard | | 9/9 | 3/3 | 1/3 | 0/3 |
| Untreated Wallboard | | 8/9 | 4/4 | 1/2 | 1/2 |
| Temperature ° C. (32.5 ± 1° C.) | | 31.7 | 31.8 | 31.7 | 31.9 |
| Relative Humidity (95 ± 3%) | | 95.2 | 94.9 | 95.0 | 94.8 |

Discoloration was observed on all three replicates during week 2 evaluation. Areas in red were observed, but are not fungal growth but rather discoloration from a clip used to suspend the samples in the chamber. Also observed on the samples were small specked areas that are also discoloration that appeared to be rust.

Based on the above, the coatings disclosed herein are effective in inhibiting and preventing *E. coli* and other hospital-related bacteria and are superior to phosphate compositions without the Group IV-carbon covalent bond component.

What is claimed:

1. A metal phosphate ceramic comprising:
a reaction product of:
at least one acidic phosphate component directly covalently bonded or indirectly bonded to a hydrophobic agent;
at least one basic metal oxide or hydroxide component directly covalently bonded or indirectly bonded to the hydrophobic agent or a different hydrophobic agent; and
the hydrophobic agent comprising a Group IV element of silicon
having at least one hydrocarbon moiety covalently bonded thereto; wherein, the at least one hydrocarbon moiety is independently, $C_{1-20}$ alkyl, phenyl, aryl; where alkyl includes straight-chain, branched, or cyclic alkyl, haloalkyl.

2. A metal phosphate ceramic precursor formulation comprising the following:
at least one acidic phosphate component;
at least one basic metal oxide or hydroxide component having a solubility constant (Ksp). of $10^{-4}$ or less in molar excess to that of the at least one acidic phosphate component; and
at least one hydrophobic agent covalently combined with the at least one acid phosphate component and the at least one basic metal oxide or hydroxide component;
wherein the at least one hydrophobic agent has one or more reactive groups capable of covalently bonding with the at least one acidic phosphate component; or the at least one basic metal oxide or hydroxide component;
the hydrophobic agent is of the general formula (I) or (II) or (III) or (IV):

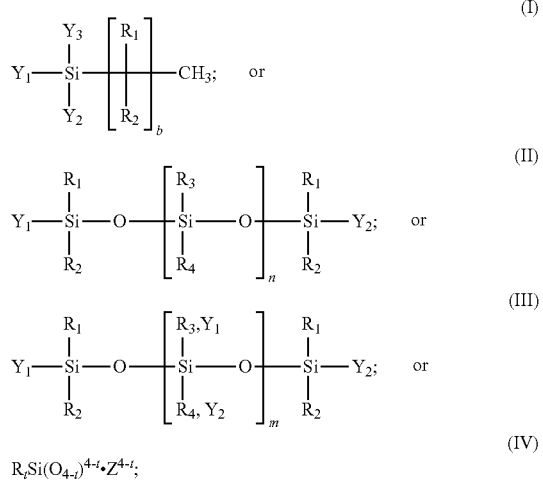

where:
$R_1$, $R_2$, $R_3$, and $R_4$ are, independently, hydrogen, $C_{1-20}$ alkyl, phenyl, aryl; where alkyl includes straight-chain, branched, cyclic or acylic alkyl, or haloalkyl;

$Y_1$, $Y_2$, and $Y_3$ is, independently, hydroxyl, $C_{1-4}$ alkoxy, phenoxide, or halogen; or, $Y_1$, $Y_2$, and $Y_3$ is, independently, an alkali metal salt, an ammonium salt, an alkylammonium salt, a phenylammonium salt, or an alklyphenylammonium salt of Si—OH;

b is 0-21; n is 1,000 to 1,000,000;

m is 0-1,000;

t is 1; and

Z is sodium or potassium.

3. The metal phosphate ceramic precursor formulation of claim 2, further comprising one or more of an inorganic mineral silicate, wollastonite, talc, amorphous magnesium silicate, amorphous calcium silicate, diatomaceous earth, aluminosilicate, olivine, calcined Kaolin, mullite, colloidal silica, silicon dioxide, and amorphous silicon dioxide.

4. The metal phosphate ceramic precursor formulation of claim 2, further comprising at least one soluble basic inorganic salt of: an alkali metal hydroxide, alkali earth metal hydroxide, a phosphate, a silicate, or an alkylsiliconate.

5. A method of forming a hydrophobic metal phosphate ceramic, the method comprising combining:
(i) at least one acidic phosphate component;
(ii) at least one basic oxide or hydroxide component having a solubility constant (Ksp). of $10^{-4}$ or less; and
(iii) at least one hydrophobic agent comprising a Group IV element of silicon having at least one hydrocarbon covalently bonded thereto, the at least one hydrophobic agent directly covalently bonded or indirectly bonded to the at least one acidic phosphate component and the at least one basic metal oxide or hydroxide component.

6. The method of claim 5, wherein the at least one hydrocarbon is independently, $C_{1-20}$ alkyl, phenyl, aryl; where alkyl includes straight-chain, branched, or cyclic alkyl, haloalkyl.

7. The method of claim 5, wherein the at least one hydrophobic agent is at least one polymeric or oligomeric siloxane with reactive silanol and/or alkoxyl groups.

8. The method of claim 5, wherein the at least one hydrophobic agent is at least one organosiliconate.

9. The method of claim 8, wherein the at least one organosiliconate is a salt; or a mono-, di-, or tri-alkyl siliconate.

10. The method of claim 5, wherein the at least one hydrophobic agent is a combination of a least two of: a polymeric or oligomeric siloxane or silanol; and at least one organosiliconate.

11. The method of claim 5, further comprising combining one or more of an inorganic mineral silicate, wollastonite, talc, amorphous magnesium silicate, amorphous calcium silicate, diatomaceous earth, aluminosilicate, olivine, calcined Kaolin, mullite, colloidal silica, silicon dioxide, or amorphous silicon dioxide.

* * * * *